United States Patent
Lee et al.

(10) Patent No.: US 10,456,740 B2
(45) Date of Patent: Oct. 29, 2019

(54) SYSTEMS AND METHODS FOR IMPROVED COLUMN OPERATION IN OFFSHORE ENVIRONMENTS

(71) Applicant: Bechtel Hydrocarbon Technology Solutions, Inc., Houston, TX (US)

(72) Inventors: Guang-Chung Lee, Houston, TX (US); Sudhir Golikeri, Richmond, TX (US); Jie Yu, Katy, TX (US)

(73) Assignee: Bechtel Hydrocarbon Technology Solutions, Inc., Houston, TX (US)

( * ) Notice: Subject to any disclaimer, the term of this patent is extended or adjusted under 35 U.S.C. 154(b) by 673 days.

(21) Appl. No.: 14/900,030

(22) PCT Filed: Jun. 19, 2014

(86) PCT No.: PCT/US2014/043193
§ 371 (c)(1),
(2) Date: Dec. 18, 2015

(87) PCT Pub. No.: WO2014/205224
PCT Pub. Date: Dec. 24, 2014

(65) Prior Publication Data
US 2016/0136569 A1    May 19, 2016

Related U.S. Application Data

(60) Provisional application No. 61/837,169, filed on Jun. 19, 2013.

(51) Int. Cl.
*B01D 53/14*    (2006.01)
*B01D 3/32*    (2006.01)
(Continued)

(52) U.S. Cl.
CPC ............... *B01D 53/18* (2013.01); *B01D 3/32* (2013.01); *B01D 3/4205* (2013.01); *B01D 19/0015* (2013.01); *B01D 53/1425* (2013.01); *B01D 53/1462* (2013.01); *B01D 53/1475* (2013.01); *B63B 35/44* (2013.01);
(Continued)

(58) Field of Classification Search
CPC .......... B01D 19/0015; B01D 2252/204; B01D 2257/504; B01D 3/32; B01D 3/4205; B01D 53/1425; B01D 53/1462; B01D 53/1475; B01D 53/18; B63B 35/44; Y02C 10/06
See application file for complete search history.

(56) References Cited

U.S. PATENT DOCUMENTS

2011/0110833 A1   5/2011   Huang et al.
2011/0168019 A1   7/2011   Northrop et al.
(Continued)

FOREIGN PATENT DOCUMENTS

WO     9832520     7/1998

OTHER PUBLICATIONS

Weedmann, J.A., Dodge, B.F.; Rectification of Liquid Air in a Packed Column, Ind. and Engng. Chemistry, 39, p. 732 1947.
(Continued)

*Primary Examiner* — Cabrena Holecek
(74) *Attorney, Agent, or Firm* — Crain Caton & James

(57) ABSTRACT

Systems and methods for improved column operation in offshore environments by using a co-current contactor system in floating production, storage and offloading (FPSO) systems.

8 Claims, 7 Drawing Sheets

(51) Int. Cl.
*B01D 3/42* (2006.01)
*B01D 53/18* (2006.01)
*B63B 35/44* (2006.01)
*B01D 19/00* (2006.01)

(52) U.S. Cl.
CPC .. *B01D 2252/204* (2013.01); *B01D 2257/504* (2013.01); *Y02C 10/06* (2013.01)

(56) References Cited

U.S. PATENT DOCUMENTS

2012/0238793 A1* 9/2012 Cullinane .......... B01D 19/0036
585/833
2012/0240617 A1 9/2012 Weiss et al.

OTHER PUBLICATIONS

Mohr, V., The influence of manufacturing tolerances on the efficiency of column trays, Cheie-Ing-Technik 51, p. 139, 1979.
Berndt K. Hoerner, Frank G. Wiessner, Eginhard A. Berger, Influence of Irregular Motion of a Floating Structure on Absorption and Distillation Processes, May 3-6, 1982, 14th Annual OTC, Houston, Texas.
Trevor Mee, Phd., Response to Examiner's Report, Canadian Patent Application No. 2914850, Apr. 3, 2018, 12 pages, Kirby IP Canada, Otawa, Ontario.
Lee W. Young, The International Search Report and the Written Opinion of the International Searching Authority, International Application No. PCT/US14/43193, dated Dec. 17, 2014, 10 pages, International Searching Authority, Alexandria, Virginia.
Duane Smith, International Preliminary Report on Patentability, International Application No. PCT/US14/43193, dated May 20, 2015, 13 pages, International Preliminary Examining Authority, Alexandria, Vierginia.
Genevieve Fortier, Phd, Examination Report, Canadian Patent Application No. 2914850, dated Dec. 19, 2016, 4 pages, Canadian Intellectual Property Office, Canada.
Trevor Mee, Phd., Response to Examiner's Report, Canadian Patent Application No. 2914850, dated Jun. 2, 2017, 20 pages, Kirby Eades Gale Baker Intellectual Property, Canada.
Genevieve Fortier, Phd., Examination Report; Canadian Patent Application No. 2914850, dated Oct. 2, 2017, 3 pages, Canadian Intellectual Property Office, Canada.

* cited by examiner

SYSTEMS AND METHODS FOR IMPROVED COLUMN OPERATION IN OFFSHORE ENVIRONMENTS

CROSS-REFERENCE TO RELATED APPLICATIONS

This Application claims priority from PCT Patent Application Serial No. PCT/US14/43193, filed on Jun. 19, 2014, which claims priority from U.S. Provisional Patent Application Ser. No. 61/837,169, filed on Jun. 19, 2013, which are incorporated herein by reference.

STATEMENT REGARDING FEDERALLY SPONSORED RESEARCH

Not applicable.

FIELD OF THE DISCLOSURE

The present disclosure generally relates to systems and methods for improved column operation in offshore environments. More particularly, the present disclosure relates to improved column operation in offshore environments by using a co-current contactor system in floating production, storage and offloading (FPSO) systems.

BACKGROUND OF THE DISCLOSURE

Offshore processing of natural gas or oil associated gas is becoming a more and more attractive alternative to conventional land-based facilities. Marginal gas fields can be economically developed by means of the FPSO concept. Offshore processing plants on floating structures can be production units for liquefied natural gas (LNG), liquefied petroleum gas (LPG), methanol, gas to liquid (GTL), or ammonia. The ability to station the FPSO vessel directly over fields avoids expensive offshore pipelines. In addition, once the existing field is depleted, the production facility can be moved to a new location to continue production.

One of the critical technical challenges for the FPSO concept is the influence of movement, acceleration and static tilt on the performance of distillation and absorption columns, such as demethanizer, deethanizer, depropanizer, glycol-based dehydration system, or acid gas removal absorber columns. For these units, the uniform countercurrent gas and liquid flow is disturbed by motion leading to reduced heat and mass transfer. Their efficiency is thus, often influenced by the deviations from the vertical position.

Though amine-based acid gas removal is a well proven technology for onshore applications, offshore conditions may result in not contacting some of the untreated or insufficiently treated feed gas due to movement or tilt of the absorber. The problem is especially severe for floating LNG FPSO, since the liquefaction process requires $CO_2$ to be reduced to less than 50 ppm to avoid risk of the freeze out and blockage of heat exchangers at cryogenic temperatures. Even a small bypass may have an adverse impact on liquefaction system operation with off-specification (off-spec.) treated gas having an excess of $CO_2$ exceeding about 50 ppm, and may require the process to shut down resulting in production losses.

Moreover, various studies have established that distillation or absorption column movement due to sea conditions can negatively affect separation efficiency in the column. In a 50 mm diameter distillation column, for example, a 50% reduction in efficiency at an inclination of 2.5 degrees was reported. In addition, a 16% reduction in efficiency at an inclination of 1.2 degrees for a 2 meter diameter one or two-pass tray column, and a 31% reduction in efficiency at an inclination of 1 degree for a 330 mm diameter one-path tray column were reported.

These reported reductions in separation efficiency will have a significant impact on the equipment performance, and eventually the reliability of the operation. Availability of production will suffer due to process shut down triggered by the off-spec treated gas from the acid gas removal unit. Equipment may need to be over-sized to offset the reduction in separation efficiency at higher sea states. Alternatively, proprietary equipment may need to be used to alleviate the uneven distribution problem.

SUMMARY OF THE DISCLOSURE

The present disclosure overcomes one or more deficiencies in the prior art by providing systems and methods for improved column operation in offshore environments by using a co-current contactor system in floating production, storage and offloading (FPSO) systems.

In one embodiment, the present disclosure includes co-current contact system for operating an absorption column in offshore environments, which comprises: i) a solvent regeneration unit having a rich amine input opening in fluid communication with a rich amine output line connected to the absorption column and a lean amine output line in fluid communication with a lean amine input opening in the absorption column; ii) a static mixer having a static mixer input opening in fluid communication with the lean amine output line, a treated gas input opening in fluid communication with a treated gas output line connected to the absorption column, and a static mixer output line; and iii) a separator having a separator input opening in fluid communication with the static mixer output line, a separator liquid output line and a separator vapor output line.

In another embodiment, the present disclosure includes a co-current contact system for operating a distillation column in offshore environments, which comprises: i) a static mixer having a first static mixer input opening in fluid communication with a reflux pump output line connected to a reflux pump, a second static mixer input opening in fluid communication with a distillation column output line connected to the distillation column and a static mixer output line in fluid communication with a condenser input opening in a condenser; and ii) a reflux drum having a reflux drum input opening in fluid communication with a condenser output line connected to the condenser, a first reflux drum output line in fluid communication with a reflux pump input opening in the reflux pump and a second reflux drum output line.

In yet another embodiment, the present disclosure includes a method for operating an absorption column in offshore environments using a co-current contact system, which comprises: i) sending lean amine from a solvent regeneration unit to the co-current contact system, wherein the co-current contact system comprises a static mixer and a separator; ii) mixing the lean amine and a treated gas from the absorption column in the static mixer; and iii) separating the mixed lean amine and treated gas into a vapor and a liquid using the separator.

In yet another embodiment, the present disclosure includes a method for operating a distillation column in offshore environments using a co-current contact system, which comprises: sending a reflux liquid from a reflux drum to the con-concurrent contact system, wherein the co-current contact system comprises a static mixer and a condenser; ii)

mixing the reflux liquid and a vapor from the distillation column in the static mixer; and iii) condensing the mixed reflux liquid and vapor into a mixed condensate using the condenser.

Additional aspects, advantages and embodiments of the disclosure will become apparent to those skilled in the art from the following description of the various embodiments and related drawings.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

The following description refers to FIGS. 1-7, which includes systems and methods for improved column operation in offshore environments using co-current contactor systems to improve mixing between incoming streams. In FIGS. 1-7, various embodiments of a co-current contact system are illustrated in an exemplary acid gas removal system or with an exemplary distillation column. In each embodiment, the co-current contact system includes a static mixer insensitive to motion, which provides mixing between the incoming streams. A static mixer may include, for example, of a series of motionless elements installed in a pipe. These elements promote e mixing of two or more fluids, which flow through the pipe due to a pressure gradient. Where needed, multiple stages of such mixing can be utilized. When used with an absorption column, the co-current contactor system is positioned downstream of the absorption column to treat the vapor leaving the absorption column overhead. When used with a distillation column, the co-current contactor system is positioned downstream of the distillation column before the condenser.

Figure 1:
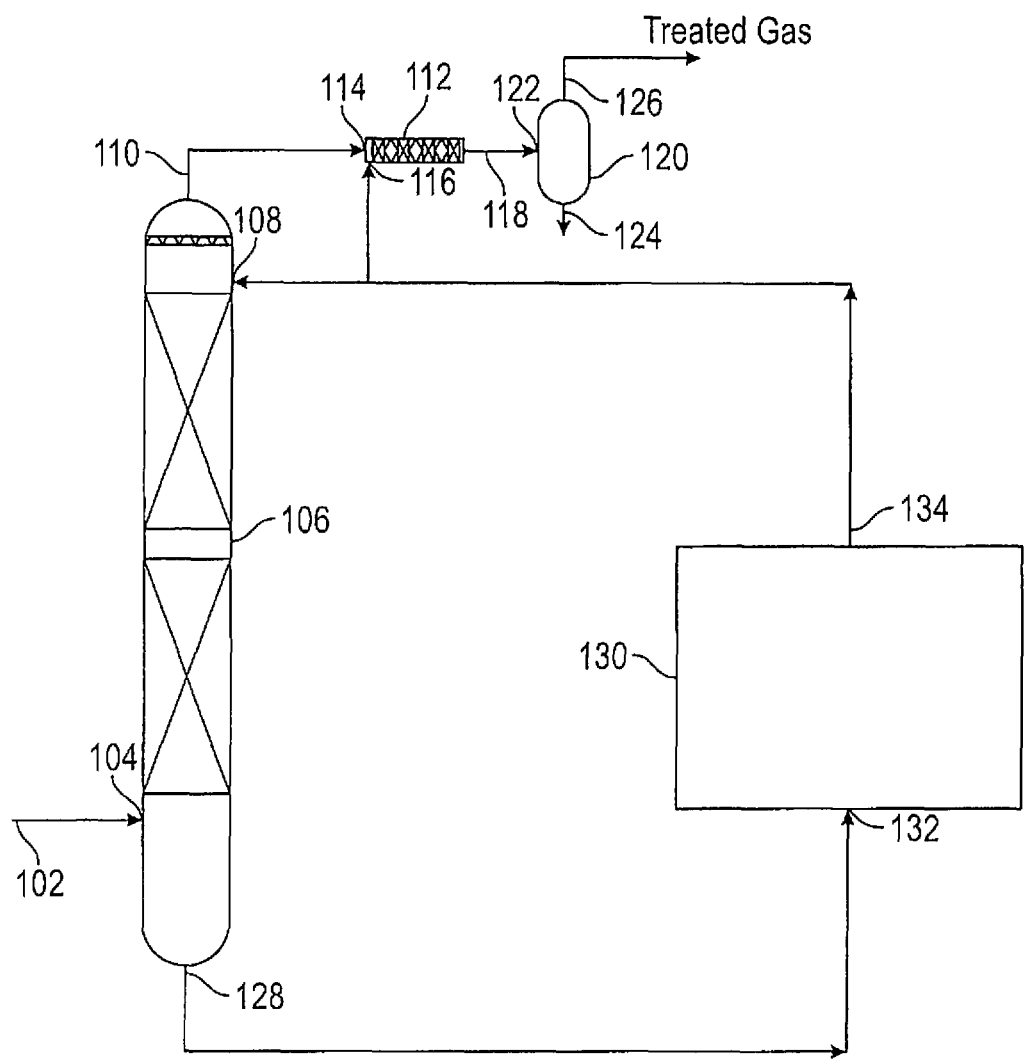
FIG. 1 is a schematic diagram illustrating one embodiment of a co-current contact system for use in a conventional acid gas removal system according to the present disclosure.

Referring now to FIG. 1, a schematic diagram illustrates one embodiment of a co-current contact system for use in a conventional acid gas removal system. The acid gas removal system includes an absorber 106 and a solvent regeneration unit 130. The co-current contact system includes a static mixer 112 and a separator 120. The absorber 106 has an input opening 104 located below the lower packed section adapted for fluid communication with a feed gas line 102. The solvent regeneration unit 130 has a rich amine input opening 132 in fluid communication with a rich amine output line 128 at the bottom of the absorber 106 and a lean amine output line 134 in fluid communication with a lean amine input opening 108 near the top of the absorber 106. The static mixer 112 has a static mixer input opening 116 in fluid communication with the lean amine output line 134, a treated gas input opening 114 in fluid communication with a treated gas output line 110 from the top of the absorber 106, and a static mixer output line 118. For liquefaction applications, the treated gas output line 110 is generally specified to contain less than 50 ppm $CO_2$ and less than 5 $mg/Nm^3 H_2S$. The separator 120 has a separator input opening 122 in fluid communication with the static mixer output line 118, a separator liquid output line 124, and a separator vapor output line 126.

Figure 2:
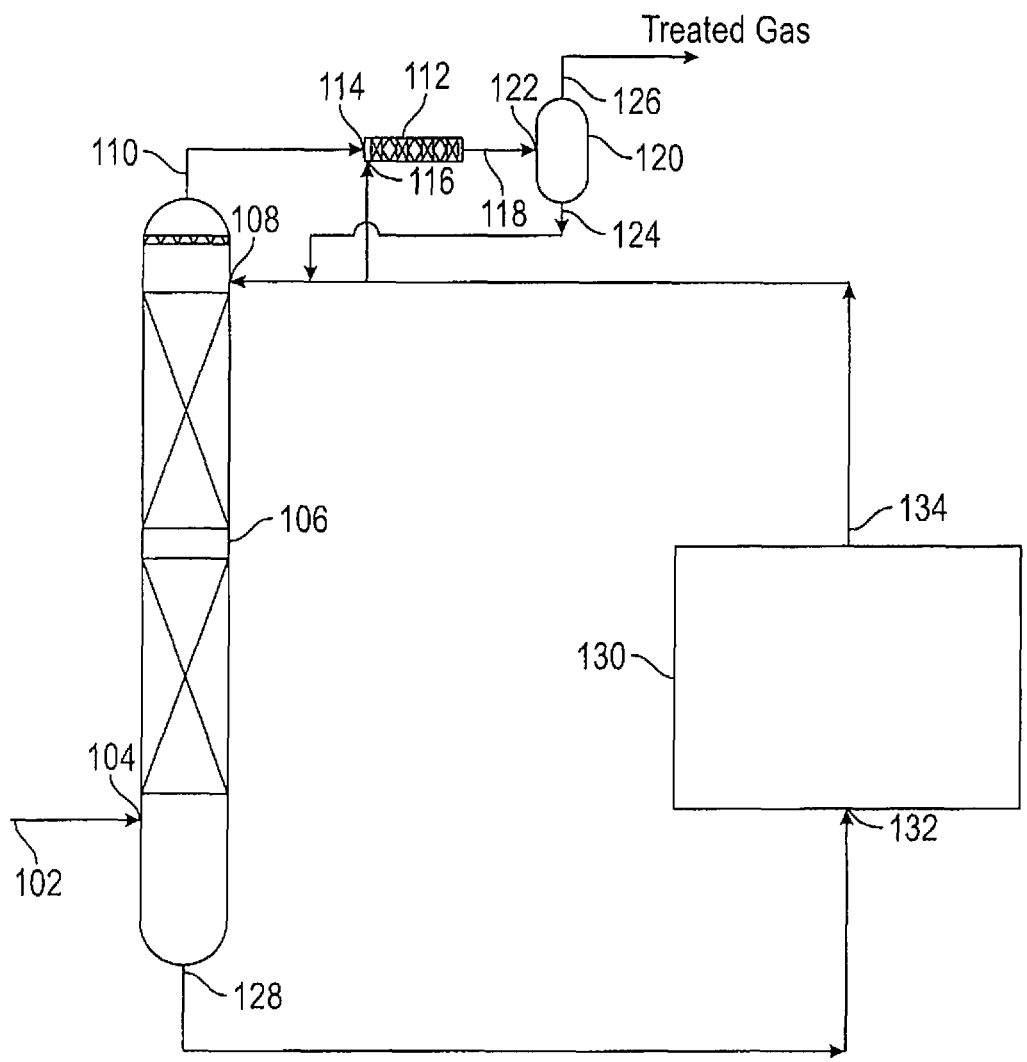
FIG. 2 is schematic diagram illustrating another embodiment of a co-currrent contact system for use in a conventional acid gas removal system according to the present disclosure.

Referring now to FIG. 2, a schematic diagram illustrates another embodiment of a co-currrent contact system for use in a conventional acid gas removal system. The acid gas removal system includes an absorber 106 and a solvent regeneration unit 130. The co-current contact system includes a static mixer 112 and a separator 120. The absorber 106 has an input opening 104 located below the lower packed section adapted for fluid communication with a feed gas line 102. The solvent regeneration unit 130 has a rich amine input opening 132 in fluid communication with a rich amine output line 128 at the bottom of the absorber 106 and a lean amine output line 134 in fluid communication with a lean amine input opening 108 near the top of the absorber 106. The static mixer 112 has a static mixer input opening 116 in fluid communication with the lean amine output line 134, a treated gas input opening 114 in fluid communication with a treated gas output line 110 from the top of the absorber 106, and a static mixer output line 118. For liquefaction applications, the treated gas output line 110 is generally specified to contain less than 50 ppm $CO_2$ and less than 5 $mg/Nm^3 H_2S$. The separator 120 has a separator input opening 122 in fluid communication with the static mixer output line 118, a separator liquid output line 124, and a separator vapor output line 126. In this embodiment, a sufficient amount of lean amine from the lean amine output line 134 is sent to the static mixer 112 through the static mixer input opening 116 where it is mixed with the gas from the treated gas output line 110 as it enters the static mixer 112 through the treated gas input opening 114. The resulting treated gas from the separator vapor output line 126 will meet acid gas specifications and semi-lean amine from the separator liquid output line 124 is combined with the lean amine from the lean amine output line 134 before entering the absorber 106 through the lean amine input opening 108.

Figure 3:
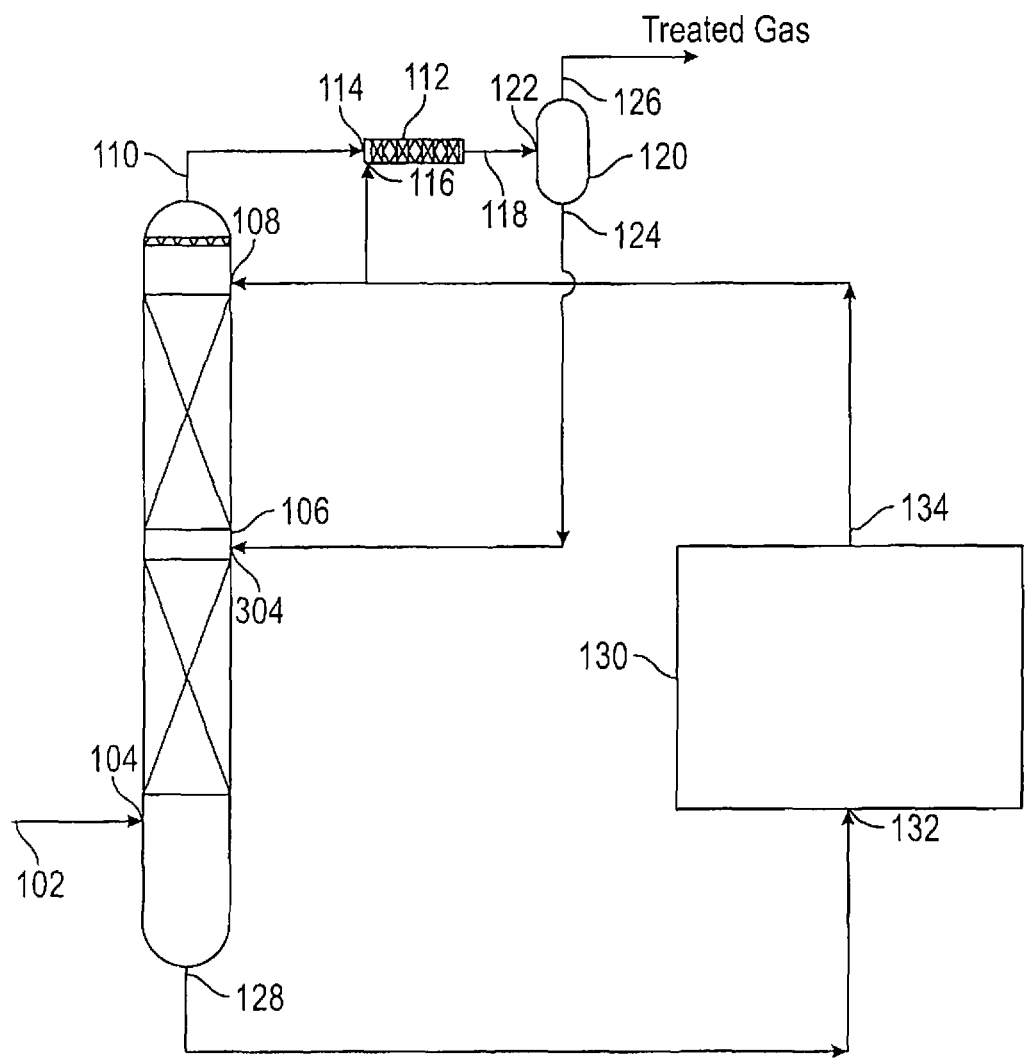
FIG. 3 is a schematic diagram illustrating yet another embodiment of a co-currrent contact system for use in a conventional acid gas removal system according to the present disclosure.

Referring now to FIG. 3, a schematic diagram illustrates yet another embodiment of a co-currrent contact system for use in a conventional acid gas removal system. The acid gas removal system includes an absorber 106 and a solvent regeneration unit 130. The co-current contact system includes a static mixer 112 and a separator 120. The absorber 106 has an input opening 104 located below the lower packed section adapted for fluid communication with a feed gas line 102. The solvent regeneration unit 130 has a rich amine input opening 132 in fluid communication with a rich amine output line 128 at the bottom of the absorber 106 and a lean amine output line 134 in fluid communication with a lean amine input opening 108 near the top of the absorber 106. The static mixer 112 has a static mixer input opening 116 in fluid communication with the lean amine output line 134, a treated gas input opening 114 in fluid communication with a treated gas output line 110 from the top of the absorber 106, and a static mixer output line 118. For liquefaction applications, the treated gas output line 110 is generally specified to contain less than 50 ppm $CO_2$ and less than 5 mg/$Nm^3 H_2S$. The separator 120 has a separator input opening 122 in fluid communication with the static mixer output line 118, a separator liquid output line 124, and a separator vapor output line 126. In this embodiment, a sufficient amount of lean amine from the lean amine output line 134 is sent to the static mixer 112 through the static mixer input opening 116 where it is mixed with the gas from the treated gas output line 110 as it enters the static mixer 112 through the treated gas input opening 114. The resulting treated gas from the separator vapor output line 126 will meet acid gas specifications and semi-lean amine from the separator liquid output line 124 is sent to the absorber 106 through another lean amine input opening 304. In this manner, the semi-lean amine will not dilute the lean amine from the lean amine output line 134.

Figure 4:
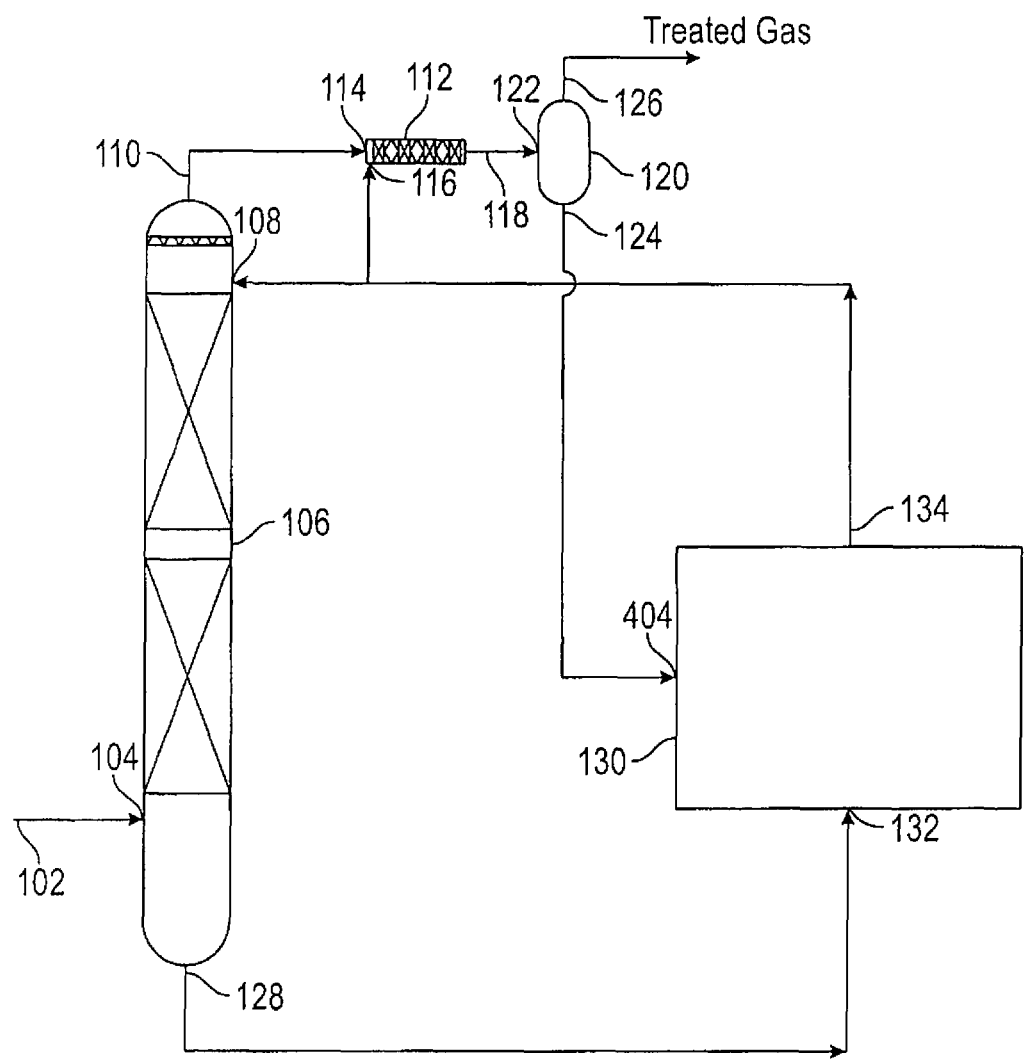
FIG. 4 is a schematic diagram illustrating yet another embodiment of a co-currrent contact system for use in a conventional acid gas removal system according to the present disclosure.

Referring now to FIG. 4, a schematic diagram illustrates yet another embodiment of a co-currrent contact system for use in a conventional acid gas removal system. The acid gas removal system includes an absorber 106 and a solvent regeneration unit 130. The co-current contact system includes a static mixer 112 and a separator 120. The absorber 106 has an input opening 104 located below the lower packed section adapted for fluid communication with a feed gas line 102. The solvent regeneration unit 130 has a rich amine input opening 132 in fluid communication with a rich amine output line 128 at the bottom of the absorber 106 and a lean amine output line 134 in fluid communication with a lean amine input opening 108 near the top of the absorber 106. The static mixer 112 has a static mixer input opening 116 in fluid communication with the lean amine output line 134, a treated gas input opening 114 in fluid communication with a treated gas output line 110 from the top of the absorber 106, and a static mixer output line 118. For liquefaction applications, the treated gas output line 110 is generally specified to contain less than 50 ppm $CO_2$ and less than 5 mg/$Nm^3 H_2S$. The separator 120 has a separator input opening 122 in fluid communication with the static mixer output line 118, a separator liquid output line 124, and a separator vapor output line 126. In this embodiment, a sufficient amount of lean amine from the lean amine output line 134 is sent to the static mixer 112 through the static mixer input opening 116 where it is mixed with the gas from the treated gas output line 110 as it enters the static mixer 112 through the treated gas input opening 114. The resulting treated gas from the separator vapor output line 126 will meet acid gas specifications and semi-lean amine from the separator liquid output line 124 is sent to the solvent regenerator unit 130 through a semi-lean amine input opening 404.

Figure 5:
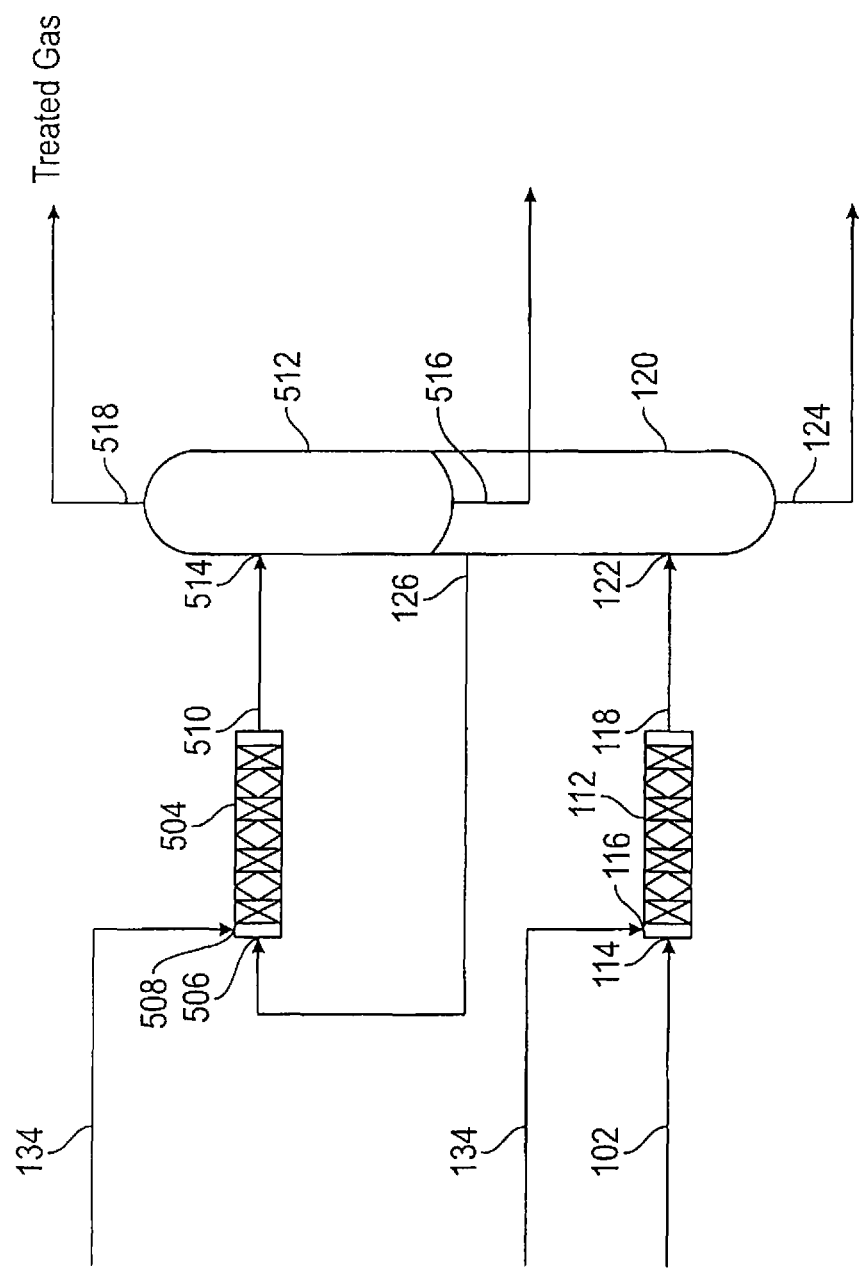
FIG. 5 is a schematic diagram illustrating another embodiment of a co-current contact system that may be used in place of the co-current contact system illustrated in FIGS. 1-4.

Referring now to FIG. 5, a schematic diagram illustrates another embodiment of a co-current contact system that may be used in place of the co-current contact system illustrated in FIGS. 1-4. The co-current contact system includes another static mixer 504 and another separator 512. The another static mixer 504 has another static mixer input opening 506 in fluid communication with the separator vapor output line 126 for carrying treated gas, a lean amine input opening 508 in fluid communication with the lean amine output line 134, and another static mixer output line 510. The another separator 512 has another separator input opening 514 in fluid communication with the another static mixer output line 510, another separator liquid output line 516 for carrying semi-lean amine, and another separator vapor output line 518 for carrying twice treated gas. In this embodiment, feed gas from the treated gas input opening 114 is mixed in the static mixer 112 with lean amine from the static mixer input opening 116. Treated gas from the separator 120 is further mixed in the another static mixer 504 with lean amine from the lean amine input opening 508. The treated gas from the another static mixer 504 will meet acid gas specifications and the semi-lean amine from the another separator liquid output line 516 and the separator liquid output line 124 is sent to the absorber 106.

Figure 6:
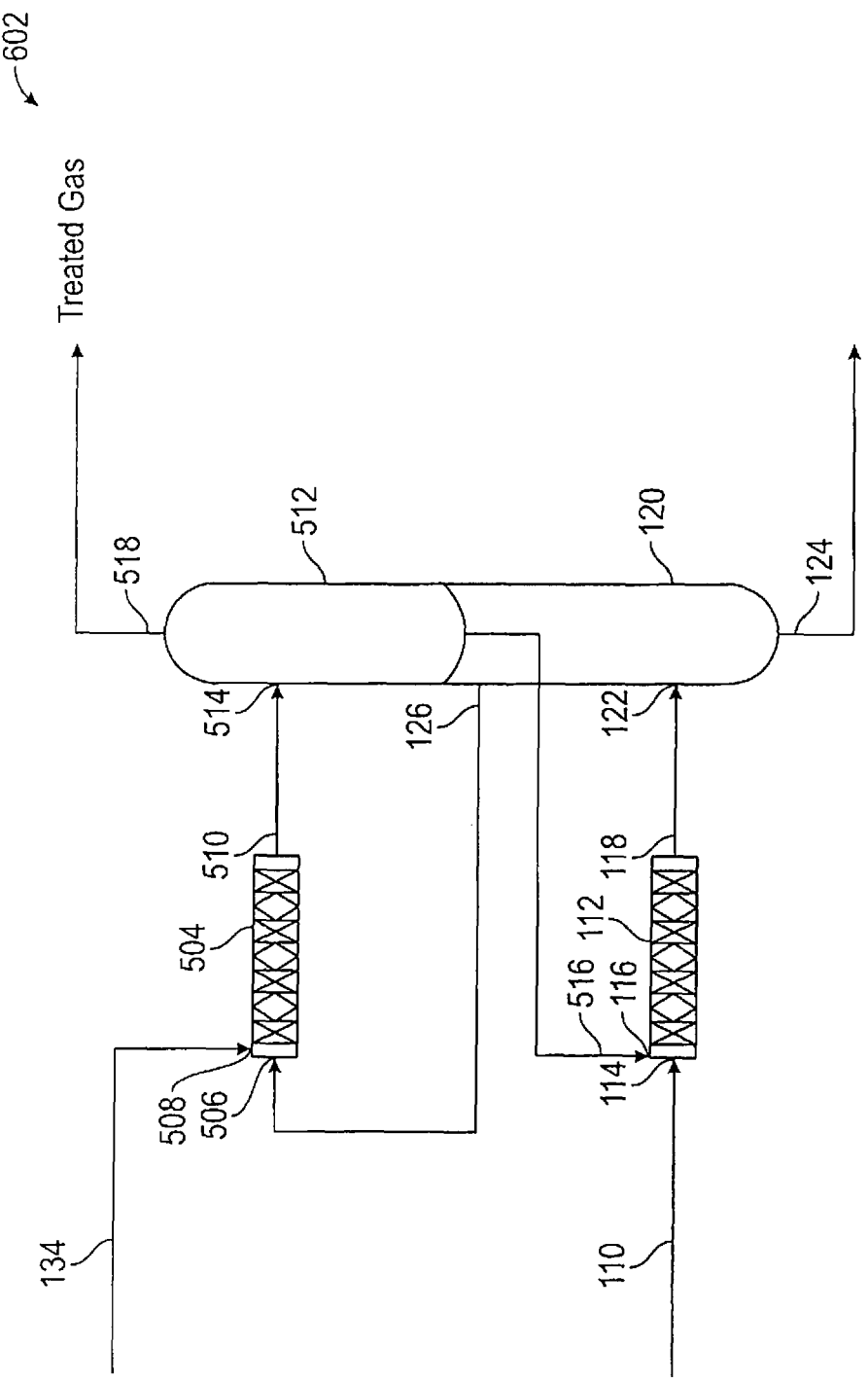
FIG. 6 is a schematic diagram illustrating yet another embodiment of a co-current contact system that may be used in place of the co-current contact system illustrated in FIGS. 1-4

Referring now to FIG. 6, a schematic diagram illustrates yet another embodiment of a co-current contact system that may be used in place of the co-current contact system illustrated in FIGS. 1-4. The co-current contact system includes another static mixer 504 and another separator 512. The another static mixer 504 has another static mixer input opening 506 in fluid communication with the separator vapor output line 126 for carrying treated gas, a lean amine input opening 508 in fluid communication with the lean amine output line 134, and another static mixer output line 510. The another separator 512 has another separator input opening 514 in fluid communication with the another static mixer output line 510, another separator liquid output line 516 for carrying semi-lean amine, and another separator vapor output line 518 for carrying twice treated gas. In this embodiment, feed gas from the treated gas input opening 114 is mixed in the static mixer 112 with semi-lean amine from the another separator output line 516. Treated gas from the separator 120 is further mixed in the another static mixer 504 with lean amine from the lean amine input opening 508. The treated gas from the another static mixer 504 will meet acid gas specifications and the semi-lean amine from the another separator liquid output line 516 is sent to the first static mixer 112. The semi-lean amine from the separator 120 is more enriched with $CO_2$ than the semi-lean amine from the another separator 512. In this manner, the total required lean amine flow rate is reduced compared to the embodiment described in reference to FIG. 5.

Figure 7:
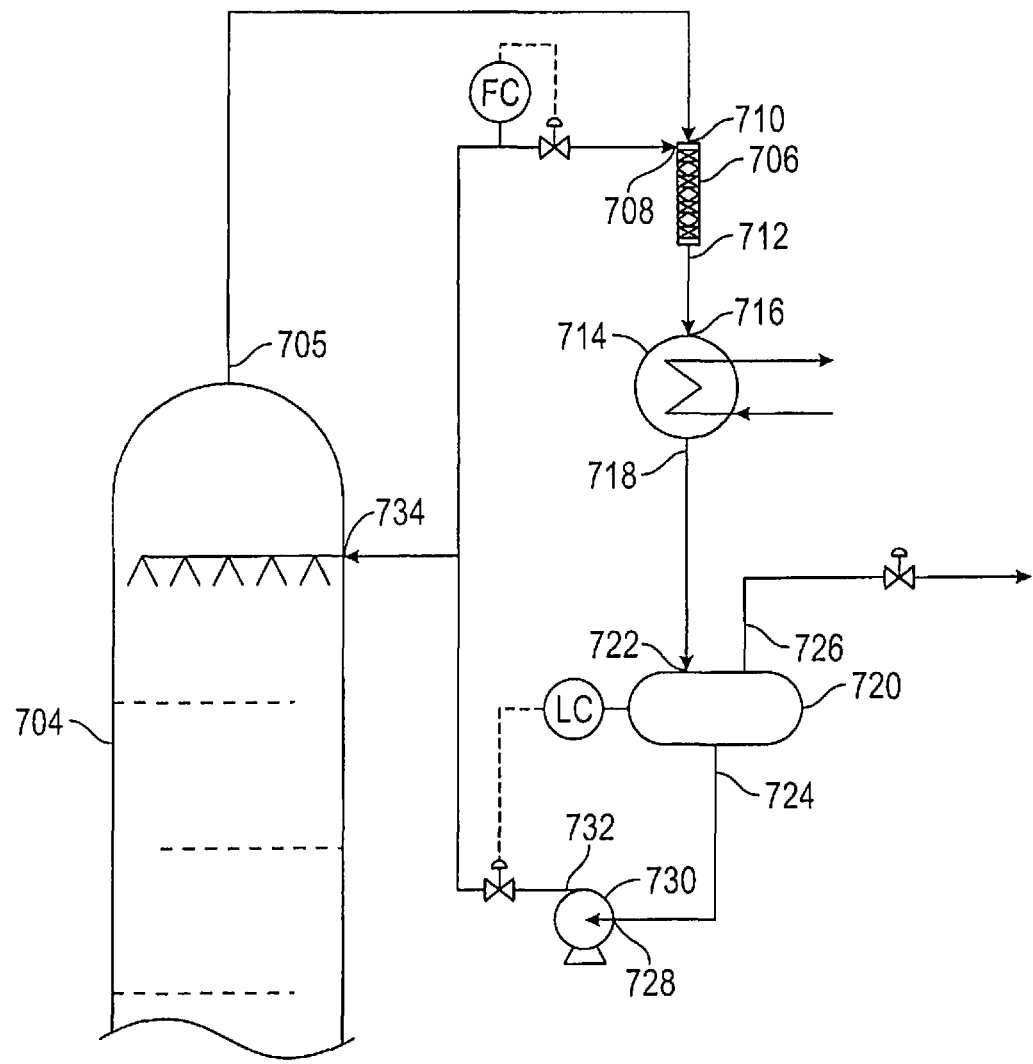
FIG. 7 is a schematic diagram illustrating one embodiment of a co-current contact system for use with a distillation column according to the present disclosure.

Referring now to FIG. 7, is a schematic diagram illustrates another embodiment of a co-current contact system for use with a distillation column. The co-current contact system includes a static mixer 706, a condenser 714, a reflux drum 720, and a reflux pump 730. The distillation column 704 has a distillation column output line 705 and a distillation column input opening 734. The static mixer 706 has a first static mixer input opening 708 in fluid communication with a reflux pump liquid output line 732, a second static mixer input opening 710 in fluid communication with the distillation column output line 705 and a static mixer output line 712 in fluid communication with a condenser input opening 716. The reflux drum 720 has a reflux drum input opening 722 in fluid communication with a condenser output line 718, a first reflux drum output line 724 in fluid communication with a reflux pump input opening 728 on the reflux pump 730, and a second reflux drum output vapor line 726. The reflux pump liquid output line 732 is in fluid communication with the distillation column input opening 734 and the static mixer input opening 708. In this embodiment, a portion of the reflux in the reflux pump liquid output line 732 is split and mixed with vapor from the distillation column output line 705 in the static mixer 706. In this manner, the overall separation is enhanced and multiple stages of such mixing, as illustrated in FIGS. 5-6, may be added.

Any of the foregoing co-current contact systems may be further modified as illustrated in FIGS. 5 and 6. And, the various embodiments of the co-current contact system illustrated in FIGS. 1-7 may be applied in a new system or may be used in preexisting systems with conventional absorption and/or distillation columns.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A co-current contact system for operating an absorption column in offshore environments, which comprises:
 a solvent regeneration unit having a rich amine input opening in fluid communication with a rich amine output line connected to the absorption column and a lean amine output line in fluid communication with a lean amine input opening in the absorption column;
 a static mixer having a static mixer input opening in fluid communication with the lean amine output line, a treated gas input opening in fluid communication with a treated gas output line connected to the absorption column, and a static mixer output line; and
 a separator having a separator input opening in fluid communication with the static mixer output line, a separator liquid output line and a separator vapor output line.

2. The system of claim 1, wherein the separator liquid output line is connected to the lean amine output line.

3. The system of claim 1, wherein the separator liquid output line is connected to another lean amine input opening in the absorption column.

4. The system of claim 1, wherein the separator liquid output line is connected to a semi-lean amine input opening in the solvent regeneration unit.

5. The system of claim 1, further comprising:
 another static mixer having another static mixer input opening in fluid communication with the separator vapor output line, a lean amine input opening in fluid communication with the lean amine output line and another static mixer output line; and
 another separator having another separator input opening in fluid communication with the another static mixer output line, another separator liquid output line and another separator vapor output line.

6. The system of claim 1, further comprising:
 another static mixer having another static mixer input opening in fluid communication with the separator vapor output line, a lean amine input opening in fluid communication with the lean amine output line and another static mixer output line; and
 another separator having another separator input opening in fluid communication with the another static mixer output line, another separator liquid output line in fluid communication with the static mixer input opening and another separator vapor output line.

7. The system of claim 1, wherein the static mixer comprises a pipe and a plurality of stationery elements positioned within the pipe.

8. The system of claim 1, wherein the rich amine output line is connected to a bottom of the absorption column, the treated gas output line is connected to a top of the absorption column and the lean amine input opening is positioned near the top of the absorption column.

\* \* \* \* \*